(12) United States Patent
Willeke

(10) Patent No.: US 9,481,290 B2
(45) Date of Patent: Nov. 1, 2016

(54) ADJUSTMENT DEVICE FOR LIGHT MODULES OF A VEHICLE

(71) Applicant: Hella KGaA Hueck & Co., Lippstadt (DE)

(72) Inventor: Franz-Georg Willeke, Anröchte (DE)

(73) Assignee: HELLA KGAA HUECK & CO., Lippstadt (DE)

( * ) Notice: Subject to any disclaimer, the term of this patent is extended or adjusted under 35 U.S.C. 154(b) by 11 days.

(21) Appl. No.: 14/368,853

(22) PCT Filed: Jan. 15, 2013

(86) PCT No.: PCT/EP2013/050605
§ 371 (c)(1),
(2) Date: Jun. 26, 2014

(87) PCT Pub. No.: WO2013/107716
PCT Pub. Date: Jul. 25, 2013

(65) Prior Publication Data
US 2014/0376251 A1 Dec. 25, 2014

(30) Foreign Application Priority Data

Jan. 20, 2012 (DE) .......... 10 2012 100 461

(51) Int. Cl.
| F21V 19/02 | (2006.01) |
| F21V 21/14 | (2006.01) |
| B60Q 1/06 | (2006.01) |
| B60Q 1/068 | (2006.01) |

(52) U.S. Cl.
CPC .............. *B60Q 1/06* (2013.01); *B60Q 1/0683* (2013.01); *B60Q 2200/32* (2013.01)

(58) Field of Classification Search
CPC ... B60Q 1/06; B60Q 1/0683; B60Q 2200/32
USPC ......................................... 362/512, 515, 523
See application file for complete search history.

(56) References Cited

U.S. PATENT DOCUMENTS

| 4,884,174 A | 11/1989 | Dorleans | |
| 5,508,896 A * | 4/1996 | Suehiro | B60Q 1/0683 362/289 |
| 6,971,777 B2 * | 12/2005 | Casses | B60Q 1/0683 362/421 |
| 6,976,773 B2 * | 12/2005 | Cavanna | B60Q 1/0683 362/427 |

FOREIGN PATENT DOCUMENTS

| DE | 19514994 C1 | 5/1996 |
| DE | 102006018305 A1 | 10/2007 |

(Continued)

*Primary Examiner* — Donald Raleigh
(74) *Attorney, Agent, or Firm* — Husch Blackwell LLP

(57) ABSTRACT

The invention relates to an adjustment device for light modules of a vehicle, by which the light module is arranged pivotal about a horizontal or vertical axis in reference to a housing, with an actuator arranged articulate along a direction of adjustment, which is connected via a link to a support frame carrying the light module, with the link comprising on the one hand a spherical link and on the other hand a cup-shaped link part accepting the former, with the cup-shaped link part comprising a laminar support section for the laminar contact at a fastening part of the support frame, with the laminar support section being supported at the fastening part in a manner displaceable perpendicular in reference to the direction of adjustment.

11 Claims, 3 Drawing Sheets

(56) References Cited

FOREIGN PATENT DOCUMENTS

| | | |
|---|---|---|
| DE | 102006018305 B4 | 2/2012 |
| EP | 1516781 A2 | 3/2005 |
| EP | 1405762 A1 | 6/2005 |
| GB | 2233754 A * | 1/1991 ........... B60Q 1/0683 |
| IT | GB 2238108 A * | 5/1991 ............ B60Q 1/076 |
| WO | 2009076438 A1 | 6/2009 |

* cited by examiner

ADJUSTMENT DEVICE FOR LIGHT MODULES OF A VEHICLE

CROSS REFERENCE

This application claims priority to International Application No. PCT/EP2013/050605, filed Jan. 15, 2013, which claims priority to German Patent Application No. 10 2012 100461.7, filed Jan. 20, 2012, both of which are hereby incorporated by reference.

FIELD OF THE INVENTION

The invention relates to an adjustment device for light modules of a vehicle, by which the light module is arranged pivotal about a horizontal or vertical axis in reference to a housing, with an actuator being arranged articulate along a direction of adjustment, which is connected via a link to a support frame carrying the light module, with the link on the one hand comprising a spherical link part and on the other hand a cup-shaped link part accepting the former.

BACKGROUND

An adjustment device for light modules of a vehicle is known from DE 195 14 994 C1, by which the light module can be pivoted about a horizontal or vertical axis in reference to a fixed housing. The adjustment device comprises an actuator, linearly displaceable, which is connected via a link to a support frame of the light module. A spherical link part is provided as a link, which is connected fixed to the actuator. On the other hand, the link shows a link element with a cup-shaped link part, in which the spherical link part of the actuator is held in a latched fashion. The gliding element is supported at a linking site of the support frame, displaceable in all directions perpendicular in reference to the direction of adjustment predetermined by the actuator, so that the deviating positions between the spherical link part of the actuator on the one side and the cup-shaped link part on the other side can be compensated. The gliding element is inserted like a drawer in the guiding accepts of the support frame, perpendicular in reference to the direction of adjustment. In the adjustment device of prior art it is disadvantageous that the spherical link part is only arranged via a linear support in the cup-shaped link part so that here only minor forces can be transmitted.

SUMMARY OF THE INVENTION

The objective of the present invention is to further develop an adjustment device for light modules of a motor vehicle such that an effective tolerance compensation at a link of the adjustment device is ensured in a simple fashion.

In order to attain this objective the invention is characterized in that the cup-shaped link part comprises a laminar support section for the laminar contacting at a fastening part of the support frame, with the laminar support section at the fastening part being supported in a fashion displaceable perpendicular in reference to the direction of adjustment.

The particular advantage of the invention comprises that by a laminar contacting of a cup-shaped link part at a support frame the transmission of high forces and direct force flux are ensured from a spherical link part into the support frame. According to the invention the necessary compensation of tolerance is essentially implemented in an area between the cup-shaped link part and the support frame.

According to a preferred embodiment of the invention the laminar support section of the cup-shaped link part is arranged in a level extending perpendicular in reference to the direction of adjustment, so that here a sufficiently large contact area is ensured to transfer force.

According to a further development of the invention the laminar support section extends in a planar fashion, with a first support section being arranged at a first leg of the cup-shaped link part and a second support section at a second leg of the cup-shaped link part, which is opposite the first leg. Advantageously this way laminar transfer areas can be created in a simple fashion, which can be produced by technology using simple tools.

According to a further development of the invention the first legs carrying the support section and the second legs of the cup-shaped link part are embodied elastic in the common level of extension so that a spherical link part can latch in the cup-shaped link part. In the latched position the spherical link part contacts in a laminar fashion a spherical interior area of the cup-shaped link part.

According to a further development of the invention the cup-shaped link part comprises two opposite wing-shaped latch elements, which undercut a stop of the fastening part of the support frame accepting the cup-shaped link part. The stop is preferably straight and arranged perpendicular in reference to the direction of adjustment and with its direction of extension it predetermines the direction of compensating tolerances. When the stop of the fastening part is arranged in a latched position between an end of the wing-shaped latch element on the one side and an end of the leg of the cup-shaped link part on the other side, here the cup-shaped link part is arranged fixed in the direction of adjustment and linearly mobile along the direction of extension of the stop.

According to further development of the invention the cup-shaped link part is arranged in a fastening part, closed over its circumference, preferably in a rectangular fastening part, fixed in the direction of adjustment and displaceable in a predetermined lateral direction in reference to the tolerance compensation. The tolerance compensation for the adjustment device therefore shows a relatively simple design.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
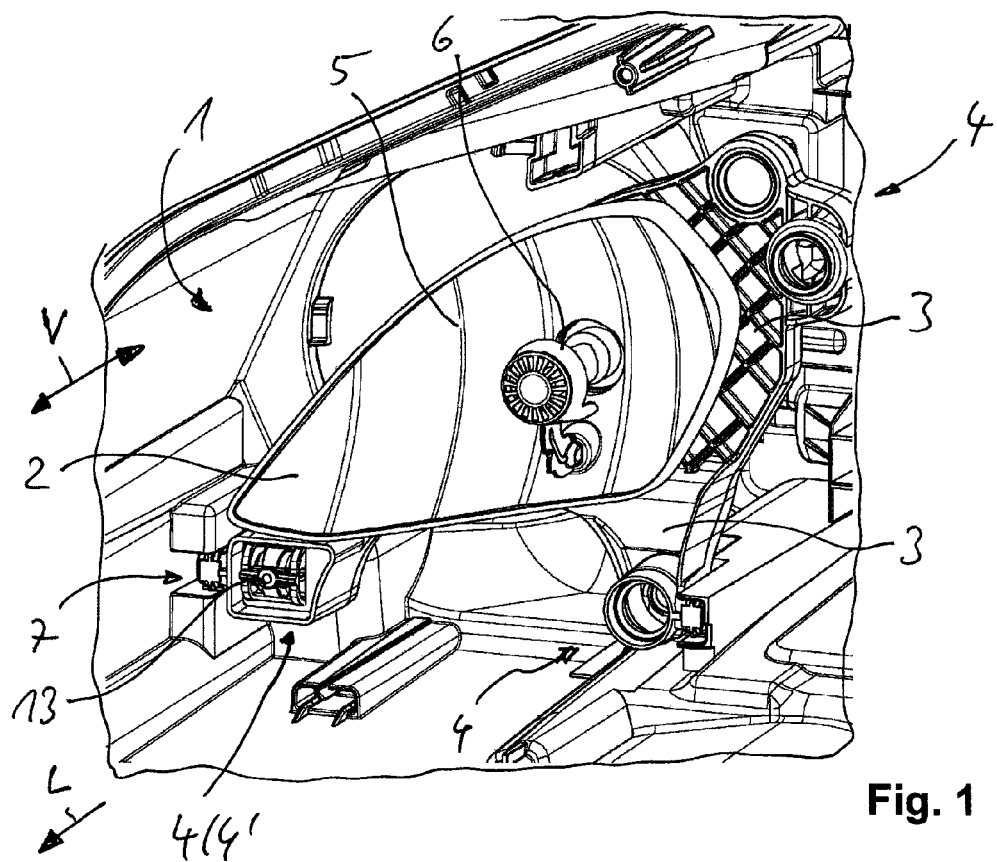
FIG. 1 is a perspective front view of the light module with an adjustment device arranged at the bottom.
Figure 2:
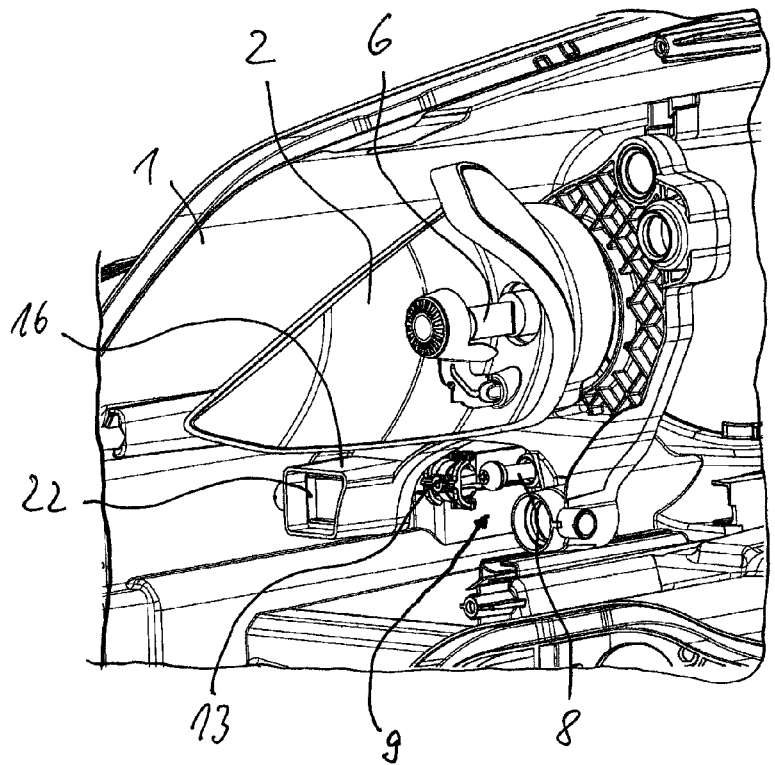
FIG. 2 is a perspective side view of the light module with the adjustment device shown in an exploded illustration.
Figure 3:
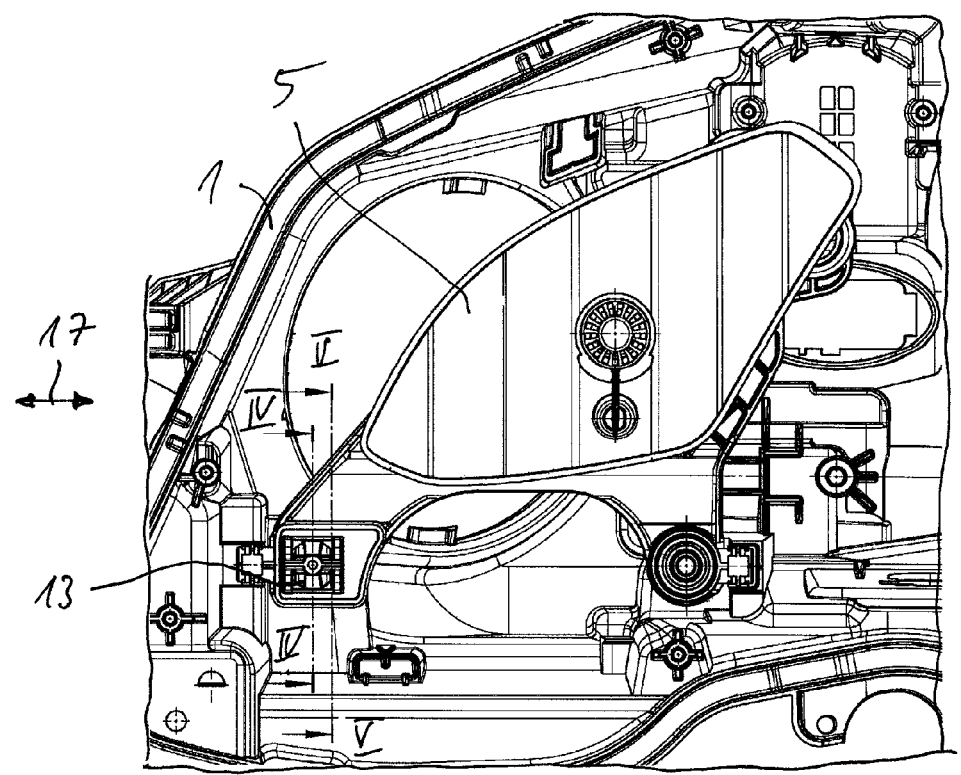
FIG. 3 is a front view of the adjustment device in the assembled state.

A headlight for vehicles comprises a cup-shaped headlight housing 1, in which a light module 2 is arranged to generate the emission of high beams and low beams. The light module 2 is fastened at a support frame 3 surrounding it, which frame via three dispersed arranged bearing points 4 is connected to the headlight housing 1 in an articulate fashion, so that the light module 2 is pivotal about a horizontal and/or vertical axis, for example for adjusting the distance of illumination or for a lighting function in curves. The light module 2 preferably comprises a reflector 5 and a light source 6.

At a lower bearing point 4' the light module 2 and/or the support frame 3 are coupled via a link 7 to an actuator 8 of an adjustment device 9, arranged in a linearly articulate fashion in a direction of adjustment V. The adjustment device 9 extends parallel in reference to a direction of light emission L of the light module 2 and essentially comprises the actuator 8, the link 7, and a fastening part 16 of the support frame 3.

Figure 4:
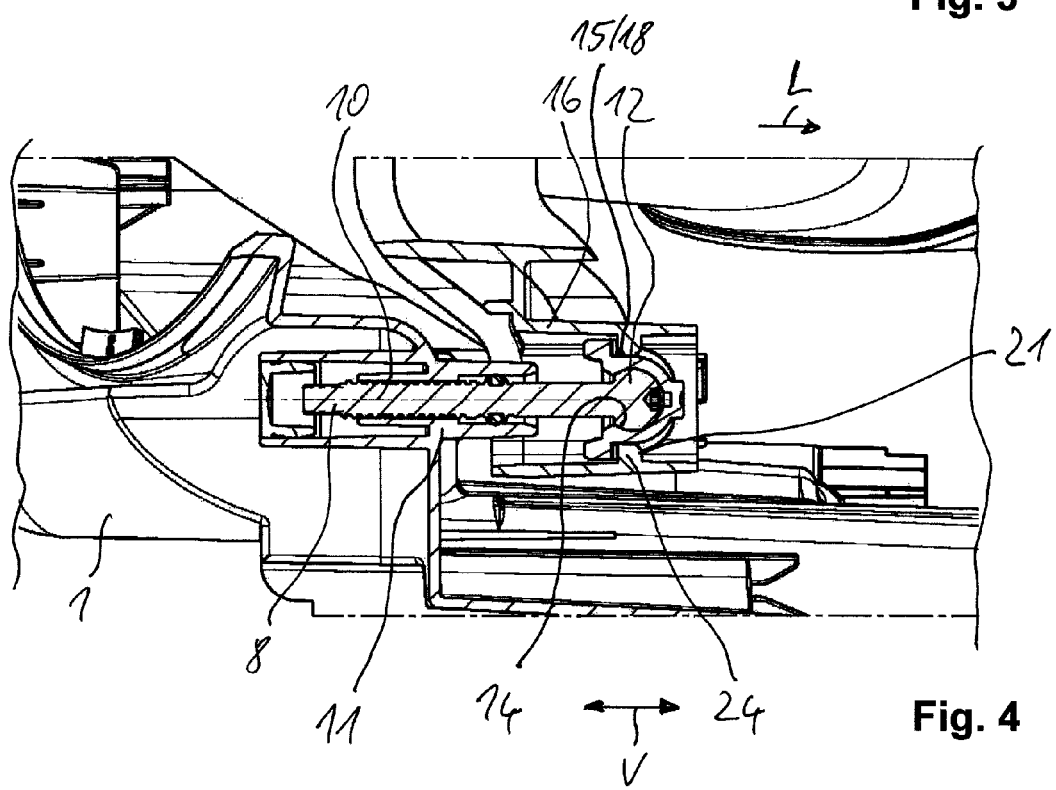
FIG. 4 is a vertical cross-section through the adjustment device in FIG. 3 along the line IV-IV.
Figure 5:
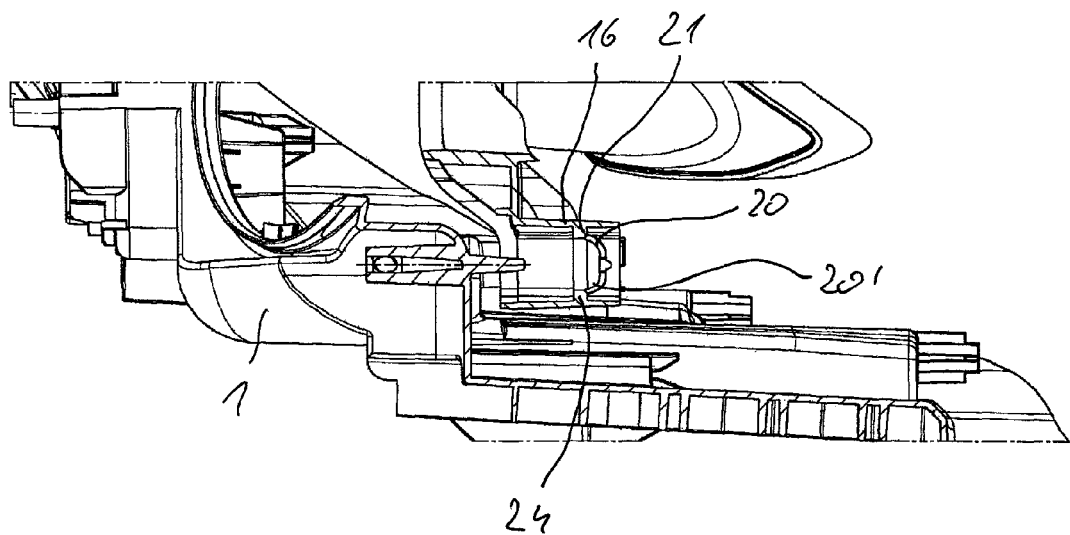
FIG. 5 is a vertical cross-section through the adjustment device in FIG. 3 along the line V-V.

As discernible from FIG. 4 the actuator 8 engages via a threaded shaft 10 thereof a threaded sheath 11 of the headlight housing 1 in a rotary fashion, so that via an operating element, not shown, (tool or actuator motor) a linear motion of the actuator 8 is implemented in the direction of adjustment V in reference to a locally fixed threaded sheath 11. This way for example a default setting of the light module 2 can be implemented.

The actuator 8 comprises at a free end a spherical link part 12, which is supported in the operating position in a cup-shaped link part 13 of the link 7 formed here. The cup-shaped link part 13 shows a spherical internal area 14, with the surface of the spherical link part 12 contacting it in a laminar fashion. The cup-shaped link part 13 therefore encompasses the spherical link part 12 almost entirely with a laminar contact.

The cup-shaped link part 13 is arranged via a laminar support section 15 in the fastening part 16 of the support frame 3, rectangular in its cross-section, fixed in the direction of adjustment V, but mobile in a lateral direction 17 extending perpendicular to the direction of adjustment V. This way, tolerances can be compensated in the horizontal direction. The support section 15 extends in a planar fashion, with a first support section 18 being arranged in the area of a free end of a first leg 19 of the cup-shaped link part 13 and a second support section 18' in the area of a free end of a second leg 19' of the cup-shaped link part 13, opposite the first leg 19. The first support section 18 and the second support section 18' of the cup-shaped link part 13 each extend as an exterior of the legs 19, 19', facing away from the first central level M1, which exterior extends like a bar perpendicular in reference to the direction of adjustment V (in the horizontal direction). The first leg 19 and the second leg 19' extend like clamps in a second central level M2, extending perpendicular in reference to a first central level M1, here extending perpendicular to the lateral direction 17. The first leg 19 and the second leg 19' of the cup-shaped link part 13 are embodied elastic, so that the spherical link part 12 can be connected by latching with the cup-shaped link part 13.

In order for the cup-shaped link part 13 to be supported fixed in the fastening part 16 opposite the direction of light emitted L the cup-shaped link part 13 additionally comprises as a latch element a first wing-shaped latch element 20 and an opposite second latch element 20'. These latch elements 20, 20' undercut a stop 21 of the fastening part 16. The stop 21 is part of an inner projection 22 of the fastening part 16, which in the assembled position extends between the ends of the first and the second legs 19, 19' on the one side and the ends of the first and second latch element 20, 20' on the other side. This way it is ensured that the cup-shaped link part 13 is arranged fixed in the axial direction (direction of adjustment V).

Figure 6:
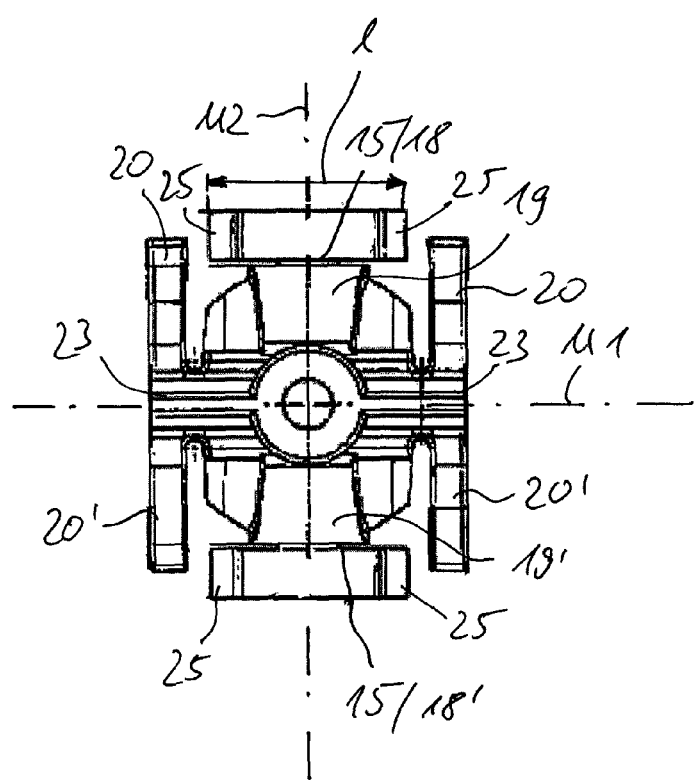
FIG. 6 is a front view of a cup-shaped link part.

The first leg 19 and the second leg 19' each extend in a central area of the cup-shaped link part 13, with the second central level M2 extending through it. The first latch element 20 and the second latch element 20' extend off-centered respectively to the two sides of the first leg 19 and/or the second leg 19', as better discernible from FIG. 6. The first leg 19 and the second leg 19' as well as the first latch element 20 and the second latch element 20' each extend arc-shaped from a common apex 23, which extends in the first central level M1 of the cup-shaped link part 13.

In an area of the cup-shaped link part 13 near the apex the first latch element 20 and the second latch element 20' extend at a greater distance from the first central level M1 than the first leg 19 and the second leg 19'. This way, undercutting of the stop 21 is achieved so that in the assembled position a face 24 of the projection 22 contacts the support section 18, 18' of the first leg 19 and/or the second leg 19'. The first latch element 20 and the second latch element 20' show a shorter length than the first leg 19 and/or the second leg 19'. The projection 22 is held in a clamped fashion between the ends of the latch elements 20, 20' and the ends of the legs 19, 19'. For this purpose, the ends of the legs 19, 19' show laterally projecting flaps 25, by which a tight seat of the ends of the legs 19, 19' at the projection 22 is ensured.

In order for the cup-shaped link part 13 to be arranged displaceable in the lateral direction 17 the opening of the fastening part 16 shows in the lateral direction 17 a greater length than a length l of the laminar support section 15 of the cup-shaped link part 13.

For the assembly the cup-shaped link part 13 is connected in a latching fashion with the spherical link part 12 of the actuator 8. Then the actuator 8 is displaced in the direction of adjustment V in reference to the support frame 3 so that the actuator 8 engages the opening of the fastening part 16 from the rear to such an extent that the latch elements 20, 20' undercut the stop 21 of the fastening part 16. The assembly position has now been reached.

| Reference list | | | |
|---|---|---|---|
| 1 | Headlight housing | V | Adjustment ring |
| 2 | Light module | I | Length |
| 3 | Support frame | L | Primary beam direction |
| 4 | Bearing point | | |
| 5 | Reflector | M1, M2 | Central level |
| 6 | Light source | | |
| 7 | Link | | |
| 8 | Actuator | | |
| 9 | Direction of adjustment | | |
| 10 | Threaded shaft | | |
| 11 | Threaded sheath | | |
| 12 | Spherical link part | | |
| 13 | Cup-shaped link part | | |
| 14 | Internal area | | |
| 15 | Laminar support section | | |
| 16 | Fastening part | | |
| 17 | Lateral direction | | |
| 18, 18' | First support section, second support section | | |
| 19, 19' | First leg, second leg | | |
| 20, 20' | Latch element | | |
| 21 | Stop | | |
| 22 | Projection | | |
| 23 | Apex area | | |
| 24 | Face area | | |
| 25 | Flap | | |

The invention claimed is:

1. An adjustment device for a light module of a vehicle, comprising:
   a housing, wherein said light module is arranged pivotal about a horizontal or vertical axis in reference to the housing;
   an actuator arranged articulate along a direction of adjustment, which is connected via a link to a support frame carrying the light module,
   wherein the link includes a spherical link part and a cup-shaped link part accepting the former,
   wherein the cup-shaped link part includes a laminar support section for a laminar contact at a fastening part of the support frame, with the laminar support section being supported in a linear displaceable fashion at the fastening part, perpendicular in reference to the direction of adjustment.

2. The adjustment device according to claim 1, wherein the laminar support section of the cup-shaped link part thereof is arranged in a level extending perpendicular in reference to the direction of adjustment.

3. The adjustment device according to claim 1 wherein the laminar support section extends planar, with a first support section being arranged in the area of a free end of a first leg of the cup-shaped link part and a second support section in the area of a free end of a second leg of the cup-shaped link part, opposite the first leg.

4. The adjustment device according to claim 3, wherein the first support section and the second support section of the cup-shaped link part each extend respectively towards an exterior of the first leg and the second leg facing away from a first central level of the cup-shaped link part.

5. The adjustment device according to claim 3 wherein the first leg and the second leg of the cup-shaped link part extend in a second central level, which extends perpendicular in reference to the first central level, and that the first leg and the second leg are embodied elastic in the direction of the second central level for the spherical link part latching in the cup-shaped link part.

6. The adjustment device according to claim 1 wherein the cup-shaped link part comprises a wing-shaped latch element for undercutting a stop of the fastening part so that the cup-shaped link part is supported in the fastening part fixed in the direction of adjustment.

7. The adjustment device according to claim 3 wherein the first leg and the second leg of the cup-shaped link part extend centrally and that a first latch element and a second latch element of the cup-shaped link part extend at the outside in an arc-like fashion from a common apex.

8. The adjustment device according to claim 3 wherein in the assembled position a projection of the fastening part, pointing inwardly, is arranged in an area between an end of the first leg and the second leg on the one hand and an end of the first latch element and the second latch element on the other hand, contacting an exterior of the first leg and the second leg.

9. The adjustment device according to claim 1 wherein the fastening part comprises an opening for receiving the cup-shaped link part, and wherein a length of the laminar support section measured in a direction perpendicular to the direction of adjustment is shorter than a length of the opening of the fastening part measured in the same direction such that the cup-shaped link part is arranged displaceable in the direction perpendicular to the direction of adjustment.

10. The adjustment device according to claim 1 wherein the cup-shaped link part shows a spherical interior area for the laminar encompassing of the spherical link part.

11. An adjustment device for a light module of a vehicle, comprising:
    a housing, wherein said light module is arranged pivotal about a horizontal or vertical axis in reference to the housing;
    an actuator arranged articulate along a direction of adjustment, which is connected via a link to a support frame carrying the light module,
    wherein the link includes a spherical link part and a cup-shaped link part accepting the former,
    wherein the cup-shaped link part includes a laminar support section for a laminar contact at a fastening part of the support frame, with the laminar support section being supported in a displaceable fashion at the fastening part, perpendicular in reference to the direction of adjustment,
    wherein the laminar support section extends planar, with a first support section being arranged in the area of a free end of a first leg of the cup-shaped link part and a second support section in the area of a free end of a second leg of the cup-shaped link part, opposite the first leg, and
    wherein in the assembled position a projection of the fastening part, pointing inwardly, is arranged in an area between an end of the first leg and the second leg on the one hand and an end of a first latch element and a second latch element on the other hand, contacting an exterior of the first leg and the second leg.

* * * * *